(12) United States Patent
Yan et al.

(10) Patent No.: US 8,412,726 B2
(45) Date of Patent: Apr. 2, 2013

(54) RELATED LINKS RECOMMENDATION

(75) Inventors: Jun Yan, Beijing (CN); Ning Liu, Beijing (CN); Zheng Chen, Beijing (CN); Lei Ji, Beijing (CN); Jiulong Wang, Beijing (CN); Xiao Liang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 12/793,047

(22) Filed: Jun. 3, 2010

(65) Prior Publication Data

US 2011/0302155 A1 Dec. 8, 2011

(51) Int. Cl.
G06F 17/30 (2006.01)
(52) U.S. Cl. ........................................ 707/767
(58) Field of Classification Search ............. 707/767, 707/754, 758, 780
See application file for complete search history.

(56) References Cited

U.S. PATENT DOCUMENTS

| | | | |
|---|---|---|---|
| 6,308,175 B1 | 10/2001 | Lang et al. | |
| 6,732,088 B1* | 5/2004 | Glance | 1/1 |
| 7,584,171 B2* | 9/2009 | Guan et al. | 1/1 |
| 2002/0188589 A1 | 12/2002 | Salmenkaita | |
| 2004/0054572 A1 | 3/2004 | Oldale | |
| 2006/0136377 A1* | 6/2006 | Patt-Shamir et al. | 707/3 |
| 2007/0027743 A1* | 2/2007 | Carson et al. | 705/10 |
| 2008/0092182 A1 | 4/2008 | Conant | |
| 2008/0147500 A1 | 6/2008 | Slaney | |
| 2009/0077057 A1 | 3/2009 | Ducheneaut | |
| 2009/0259646 A1* | 10/2009 | Fujita et al. | 707/5 |
| 2009/0300547 A1 | 12/2009 | Bates | |
| 2010/0191582 A1* | 7/2010 | Dicker et al. | 705/10 |
| 2011/0072033 A1* | 3/2011 | White et al. | 707/768 |
| 2011/0208730 A1* | 8/2011 | Jiang et al. | 707/727 |

OTHER PUBLICATIONS

Basilico, J., T. Hofmann, Unifying collaborative and content-based filtering, Proc. of the Twenty-first Int'l Conf. on Machine Learning, Jul. 2004, Banff, Alberta, Canada.
Claypool, M., A. Gokhale, Tim Miranda, Pavel Murnikov, Dmitry Netes, and Matthew Sartin, Combining content-based and collaborative filters in an online newspaper, Proc. of ACM SIGIR Workshop on Recommender Systems, Aug. 1999, pp. 40-48.
Li, Q., B. M. Kim, An approach for combining content-based and collaborative filters, Proc. of the Sixth Int'l Workshop on Info. Retrieval with Asian Languages, Jul. 2003, pp. 17-24, Sappro, Japan.

(Continued)

*Primary Examiner* — Cam-Linh Nguyen
(74) *Attorney, Agent, or Firm* — Lyon & Harr, LLP; Katrina A. Lyon

(57) ABSTRACT

The related links recommendation technique described herein employs combined collaborative filtering to recommend related web pages to users. The technique creates multiple collaborative filters which are combined in order to create a combined collaborative filter to recommend web pages similar to a given web page to a user. One query-based collaborative filter is created by using query search clicks (e.g., user input device selection actions on search results returned in response to a search query). Another user-behavior-based collaborative filter is created by using query search clicks and user clicks while browsing websites (e.g., user input device selection actions while a user is browsing websites). Lastly, another content-based collaborative filter based on similar content of web pages is created by finding web pages with similar content.

20 Claims, 4 Drawing Sheets

OTHER PUBLICATIONS

Pérez-Alcázar, J. de J., M. L. Calderón-Benavides, C. N. González-Caro, Towards an information filtering system in the web integrating collaborative and content based techniques, LA-WEB 1st Latin American Web Congress, Empowering Our Web, Nov. 2003, pp. 222-225, Sanitago, Chile.

Tang, T. Y., P. Winoto, K. C. C. Chan, Scaling down candidate sets based on the temporal feature of items for improved hybrid recommendations, Intelligent Techniques for Web Personalization, IJCAI 2003 Workshop, ITWP 2003, pp. 169-186, Acapulco, Mexico, Aug. 2003.

Zanker, M., M. Jessenitschnig, D. Jannach, S. Gordea, Comparing recommendation strategies in a commercial context, IEEE Intelligent Systems, Special Issue on Recommender Systems, May-Jun. 2007, vol. 22, No. 3, pp. 69-73.

* cited by examiner

RELATED LINKS RECOMMENDATION

With the explosion of people using the Internet, searching and browsing the World Wide Web has become a very prominent and popular past-time. Many users spend hours in front of a computer browsing websites or searching for specific information by entering queries into a search engine.

There has been much work done in terms of improving search engines and ranking search results. Various search result ranking algorithms have been developed. Additionally, collaborative filtering technology has been used in recommending web sites to users, but collaborative filtering has had problems handling a large number of users and has high computation complexity. Many web site recommendation techniques require manual computations by humans to provide pertinent recommendations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The related links recommendation technique described herein employs combined collaborative filtering to determine the similarity between websites to recommend related web pages to users. In one embodiment the related links recommendation technique performs multiple collaborative filtering procedures, combining the results in order to recommend pages similar to a given web page to a user. One query-based collaborative filtering procedure employed by the related links recommendation technique creates a query-based collaborative filter, herein called a query-click model, using query search clicks (e.g., user input device selection actions on search results returned in response to a search query). Another user-behavior-based collaborative filtering procedure employed by the technique creates a user-behavior-based collaborative filter, herein called a user click model, using query search clicks and user clicks while a user is browsing websites (e.g., user input device selection actions while a user is browsing websites). Lastly, another content-based collaborative filtering procedure employed by the technique generates a content-based collaborative filter, herein called a content-click model, based on similar content of web pages. As discussed previously, the different collaborative filters can be combined to create a combined collaborative filter/model that can recommend one or more web pages based on a currently selected website. It should be noted that all of the collaborative filters can be combined or just two of the collaborative filters can be combined.

In one embodiment of the related links recommendation technique, the technique operates in two parts—an offline part that computes the collaborative filters, including the combined collaborative filter; and an online part that provides an on-line recommendation of similar websites based on an input website. More specifically. In off-line calculation, similarity between all pairs of websites available is calculated and a combined collaborative model is created. The combined collaborative filter contains the similarity between every pair of websites. Then during on-line submission of a website for which a recommendation is sought, the technique employs the combined collaborative filter to recommend the most similar websites to the website for which the recommendation is sought.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the related links recommendation technique, reference is made to the accompanying drawings, which form a part thereof, and which show by way of illustration examples by which the related links recommendation technique described herein may be practiced. It is to be understood that other embodiments may be utilized and structural changes may be made without departing from the scope of the claimed subject matter.

1.0 Related Links Recommendation Technique

The following sections provide an overview of the related links recommendation technique, as well as an exemplary architecture and processes for employing the technique. Mathematical computations for one exemplary embodiment of the technique are also provided.

1.1 Overview of the Technique

With the rapid growth of the World Wide Web, search engines are playing a more indispensable role than ever in the daily lives of Internet users. The related links recommendation technique described herein employs combined collaborative filtering to determine website similarity and to recommend related web pages to users based on input query data, web page content and user behavior data.

In one embodiment, the related links recommendation technique operates in two parts—a first part that computes collaborative filters and a combined collaborative filter, and a second part that provides a recommendation of similar websites based on an input website and the computed combined collaborative filter.

The related links recommendation technique can employ multiple collaborative filtering procedures to create collaborative filters or models. In one embodiment the technique creates a query click model, a user click model and a content based click model. These different collaborative filters/models can be combined in various combinations to create a combined collaborative filter that can determine website similarity and recommend one or more web pages based on a currently selected website. The combination of these collaborative filters boosts the quality of the recommended website(s) by providing a better, more relevant recommendation of related websites than one collaborative filter being used alone.

1.2 Exemplary Architecture.

Figure 1:
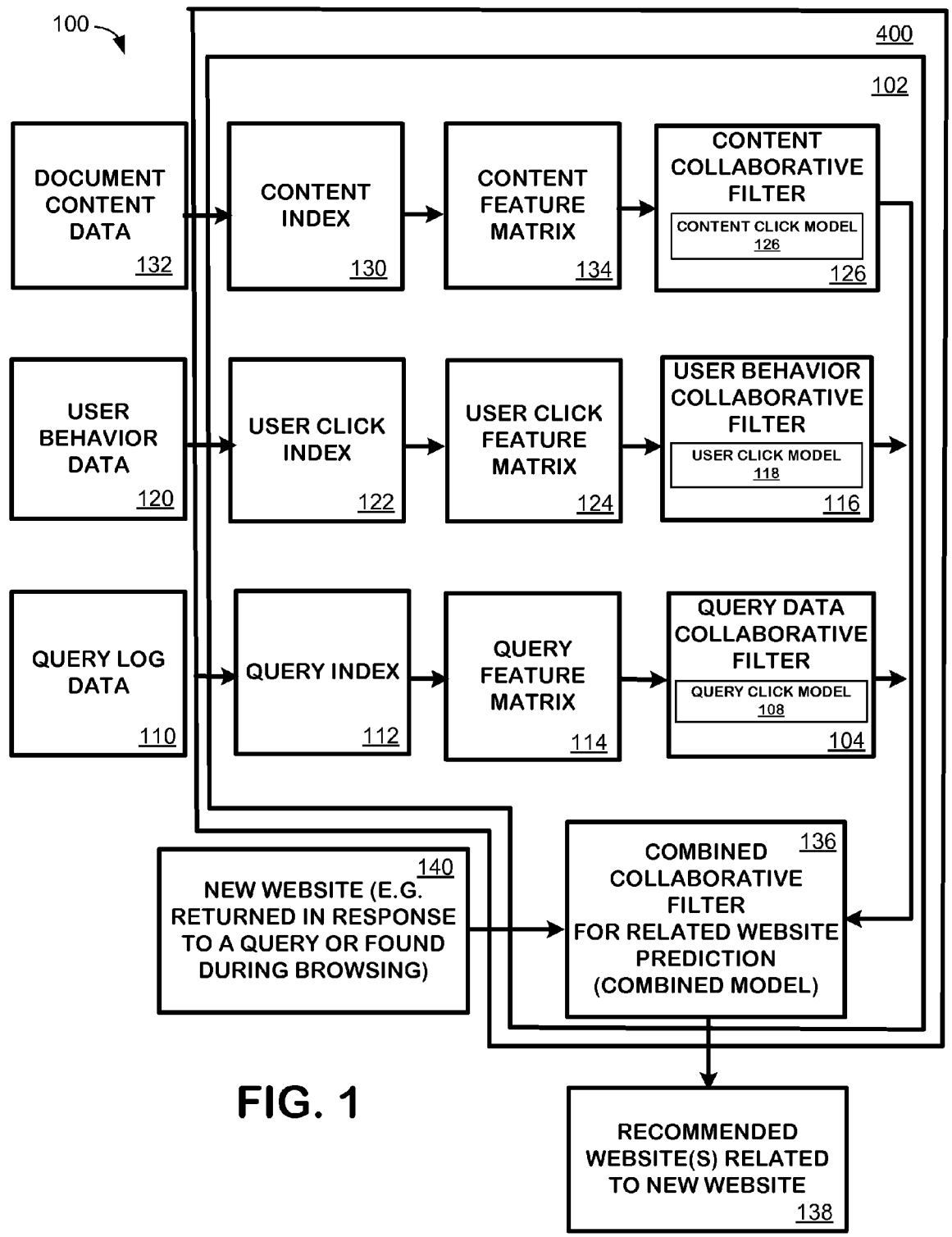
FIG. 1 is an exemplary architecture for employing one exemplary embodiment of the related links recommendation technique described herein.

FIG. 1 provides an exemplary architecture 100 for employing one embodiment of the related links recommendation technique. As shown in FIG. 1, the architecture 100 employs a related links recommendation module 102 that resides on a computing device 400, such as will be discussed in greater detail with respect to FIG. 4.

In one embodiment, the architecture 100 includes a query data collaborative filter module 104 that computes a query-based collaborative filter, herein called a query click model 106, based on input query log data 110 such as search clicks (e.g., user input device selections made on search results returned in response to a search query). In one embodiment the query click data is obtained from data of a user session which typically includes a user ID, a user session ID, website Uniform Resource Locators (URLs) clicked in response to one or more queries and the time period of the user session. In one embodiment of the technique a query click index 112 is computed that includes a set of queries and websites clicked for each query, as well as the frequency with which each website is clicked. In one embodiment of the technique, the query index 112 is used to create a query click feature matrix 114 where each website is represented as a feature vector where for a given website, each query for which the website was clicked and frequency with which it was clicked is represented. The similarity between pairs of websites clicked is then computed using the feature vectors of the feature matrix 114 described above in the query data collaborative filter 104.

In one embodiment of the technique the similarity between the pairs of websites are obtained by using a cosine similarity function. In one embodiment of the technique, if the pair of websites are not similar enough, this pair of websites will be considered as noise and discarded from further calculations. The technique obtains a confidence value between pairs of related web pages. The higher the score is, the more similar the web page pair is. Additionally, in one embodiment of the technique a minhash function can be used to create new features which are used to assess similarity scores. This minhash function is discussed in greater detail in Section 1.4. The query click model 106 is thus created as a set of website-website pairs along with a confidence value that represents the similarity between each website-website pair.

Additionally, in one embodiment, the architecture employs a user-behavior-based collaborative filter module 116 that computes a user-behavior-based collaborative filter, herein called a user click model 118, based on user behavior data 120 such as the number of co-clicks by users on a given website. In this case the user click data is also obtained from user sessions with session data similar to that described in the paragraph above. In one embodiment of the technique a user click index 122 is computed that includes a set of websites clicked for each given user session. The user click index 122 can be used to create a user click feature matrix 124 where each website is represented as a feature vector where each session that website was clicked in appears. The similarity between pairs of websites clicked is then computed in the user behavior collaborative filter module 116 by counting the number of times the same sessions appeared between each website pair according to the feature vectors of the feature matrix 124 described above. In one embodiment, the similarity between the pairs of websites can be obtained by using a cosine similarity function. In one embodiment of the technique, if the pair of websites is not similar enough, this pair of websites will be considered as noise and discarded from further calculations. The technique, in one embodiment, obtains a confidence value between pairs of related web pages. The higher the score is, the more similar the web page pair. The user click model 118 is thus created as a set of website-website pairs along with a confidence value that represents the similarity between each website-website pair.

The architecture 100 can also employ a content-based collaborative filter module 126 that computes a content-based collaborative filter, herein called a content click model 128, based on the frequency of terms (words) in the content of a given website. In this case, in one embodiment, the content data is obtained, for example, by crawling the web to retrieve websites. In one embodiment of the technique, a content index 130 is computed that includes a set of websites of similar content (e.g., content that shares many of the same words or terms). In one embodiment of the technique, the content index 130 is used to create a content based term feature matrix 134 where each website is represented as a feature vector where the terms in the content appear. The similarity between pairs of websites is then computed in the content collaborative filter module 126 by counting the number of times that each term appeared between each website pair according to the feature vectors described above. In one embodiment of the technique, the similarity between the pairs of websites is obtained by using a cosine similarity function. If the pair of websites are not similar enough, this pair of websites can be considered as noise and discarded from further calculations. The technique, in one embodiment, obtains a confidence value between pairs of related web pages. The higher the score is, the more similar the web page pair is. The content click model 128 is thus created as a set of website-website pairs along with a confidence value that represents the similarity between each website-website pair.

Once obtained, the query-based collaborative filter (e.g. the query click model) 106, the user-behavior-based collaborative filter (e.g., the user click model) 118 and the content-based collaborative filter (e.g., the content click model) 128 can be combined to create a combined collaborative filter 136 for recommending web pages 138 related to another web page 140, such as the one a user may be looking at. In creating this combined collaborative filter 136 the outputs from the query-based collaborative filter (e.g. query click model) 106, the user-behavior-based collaborative filter (e.g., user click model) 118 and the content-based collaborative filter (content click model) 128 (and their associated confidence scores) are combined. It should be noted that not all three of the collaborative filters (128, 108 118) need to be combined to create the combined collaborative filter 136. Various combinations of the outputs of the three collaborative filters (128, 108 118) can be used. For example, only the query data collaborative filter (e.g., query click model) 108 and the user behavior collaborative filter (e.g., user click model) 118 outputs can be combined. Or, for example, only the query data collaborative filter (e.g., query click model) 108 and the content-based collaborative filter (e.g., content click model) 128 outputs can be combined to create the combined collaborative filter. In one embodiment the query-based collaborative filter (e.g. query click model) 108, the user-behavior-based collaborative filter (e.g., user click model) 118 and the content-based collaborative filter (content click model) 128 are combined by combining the confidence scores of the filters which represent website similarity for pairs of websites. The higher the combined confidence score is, the more similar the web page pair is. Given a web page 140, in one embodiment, the technique uses the combined collaborative filter 136 to select the top similar web pages, those with the highest combined confidence score, to recommend to a user 138.

For example, in one embodiment the related links recommendation technique operates in two parts—a first part that computes the collaborative filters and the combined collaborative filter, and a second part that provides a recommendation of similar websites based on an input website and the computed combined collaborative filter. So, for example, given a website A, the technique first calculates the content-based collaborative filter (e.g., the content click model), the user click-based collaborative filter (e.g., the user click model) and the query-based collaborative filter (e.g., the query click model) and combines the results of these filters together. The result is the similarity between website A and other websites in the system, such as {<A, B, 0.9>,<A,C,0.8>,<A,D,0.2>} which in one embodiment means website A and website B are about 90% similar, website A and website B are about 80% similar and so forth. In the online recommendation, when a user browses and acts on website A, the system will search the combined collaborative filter model and find which websites are most similar to website A based on the similarity score and then provide a recommendation to the user of the websites that are most similar to website A. In this way, if a similarity threshold of 0.5 is used to decide whether to recommend a website to a user, then websites B and C would be recommended to the user on website A.

In one embodiment of the related links recommendation technique, the query-based collaborative filter (e.g. query click model) 108, the user-behavior-based collaborative filter (e.g., user click model) 118 and the content-based collaborative filter (content click model) 128 can be weighted differently when creating the combined collaborative filter 136.

Details of the mathematical computations of this exemplary embodiment are discussed in greater detail in Section 1.4.

1.3 Exemplary Processes Employed by the Related Links Recommendation Technique.

The following paragraphs provide descriptions of exemplary processes for employing the related links recommendation technique. It should be understood that in some cases the order of actions can be interchanged, and in some cases some of the actions may even be omitted.

Figure 2:
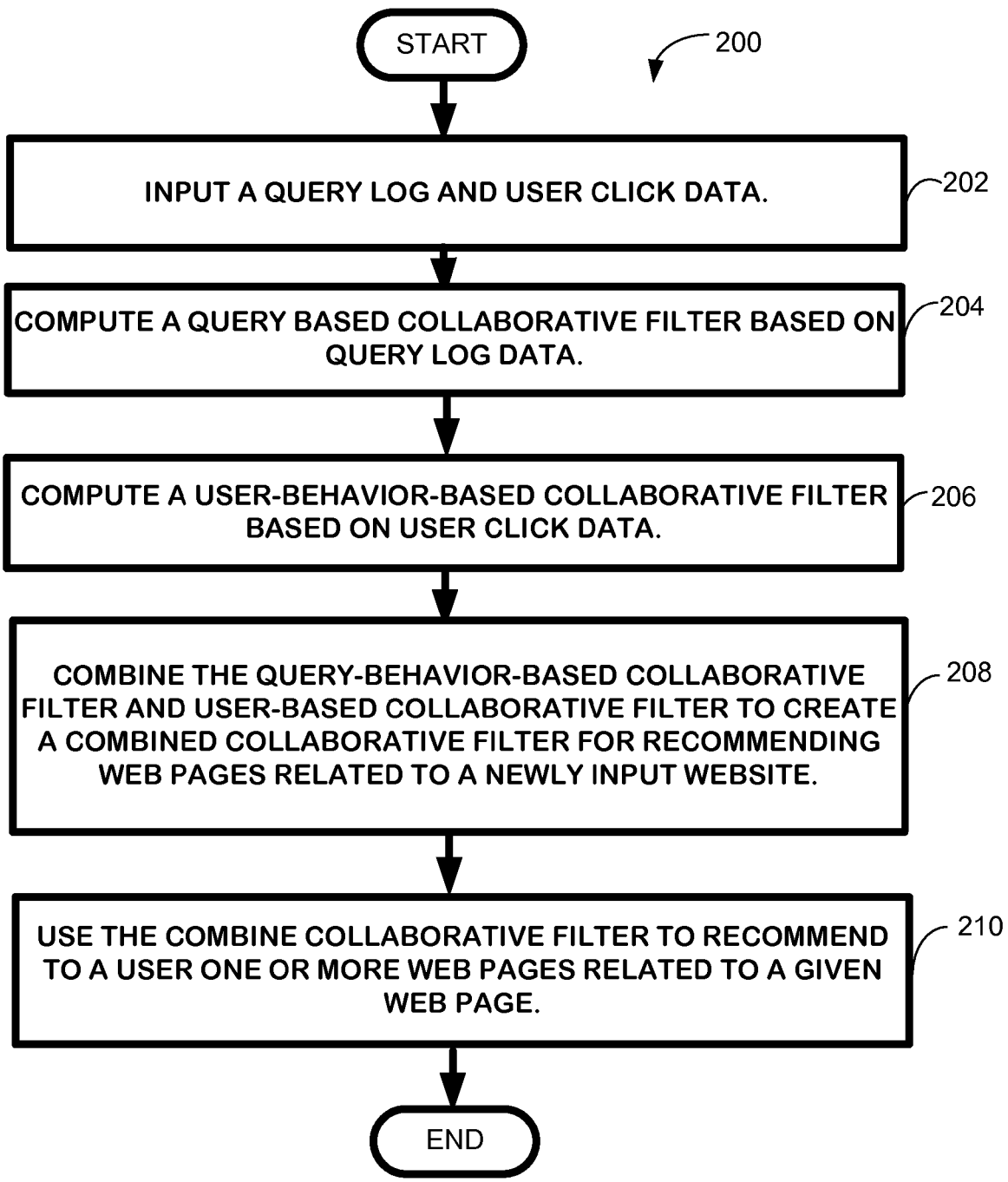
FIG. 2 depicts a flow diagram of an exemplary process for employing one embodiment of the related links recommendation technique.

FIG. 2 depicts an exemplary computer-implemented process 200 for recommending web pages to a user based on query log data and user behavior data. As shown in block 202, query log data and user click data is input. For example, this query log data and user click data may include user ID, a user session ID, website URLs clicked in response to one or more queries and the time period of the user session. A query-based collaborative filter (e.g., query click model) based on the query log data is computed, as shown in block 204. In one embodiment of the technique to create the query click model a query click index is computed that includes a set of queries and websites clicked for each query, as well as the frequency with which each website is clicked. This query click index is used to create a query click feature matrix where each website is represented as a feature vector where for a given website, each query for which the website was clicked and frequency with which it was clicked is represented. The similarity between pairs of websites clicked is then computed using the feature vectors described above. In one embodiment of the technique, if the pair of websites are not similar enough, this pair of websites will be considered as noise and discarded from further calculations. The technique, in one embodiment, obtains a confidence value between pairs of related web pages. The higher the score is, the more similar the web page pair is.

As shown in block 206, a user-behavior-based collaborative filter is also computed based on the number of co-clicks by users on a given website. The user click data is obtained from user session data. To create this user-behavior-based collaborative filter (user click model), in one embodiment of the technique, a user click index is computed that includes a set of websites clicked for a given user session. The user click index is used to create a user click feature matrix where each website is represented as a feature vector where each session that website was clicked appears. The similarity between pairs of websites clicked is then computed by counting the number of times the same sessions appeared between each website pair according to the feature vectors of the user click matrix described above. In one embodiment of the technique, if the pair of websites is not similar enough, this pair of websites will be considered as noise and discarded from further calculations. The technique obtains a confidence value between pairs of related web pages that are not discarded. The higher the score is, the more similar the web page pair is.

Once obtained, the query-based collaborative filter and user-based collaborative filter are combined, as shown in block 208, to create a combined collaborative filter for recommending web pages related to a web page returned in response to a search query. The combined collaborative filter is created by combining the confidence scores of pairs of websites as will be discussed in more detail in Section 1.4. Given a web page, in one embodiment, the technique will select the top similar/confident web pages to recommend to a user, as shown in block 210, and previously discussed with respect to FIG. 1.

Figure 3:
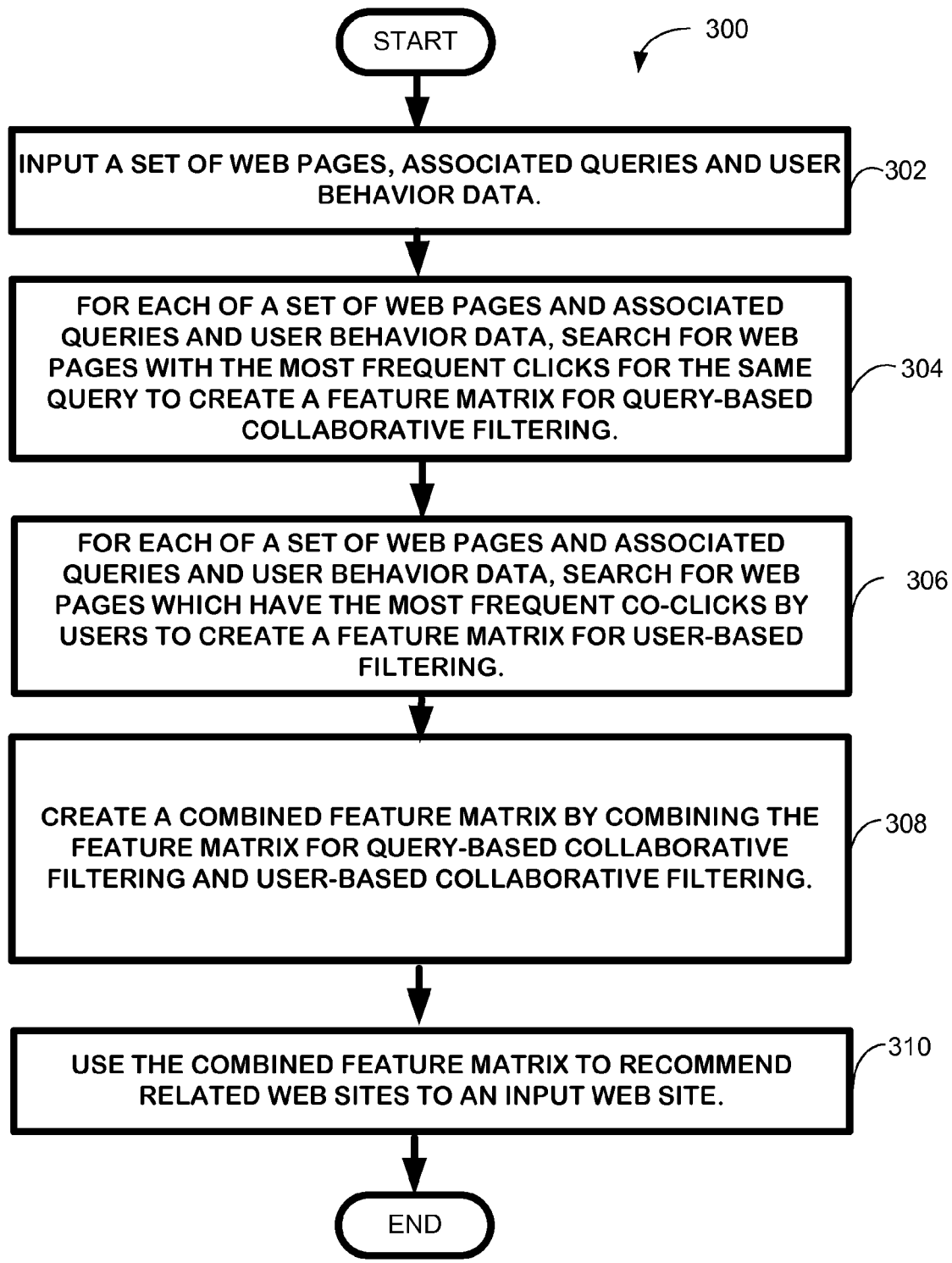
FIG. 3 depicts a flow diagram of another exemplary process for employing one embodiment of the related links recommendation technique.

FIG. 3 depicts another exemplary computer-implemented process 300 for recommending related web pages to users. In this embodiment, for each of a set of web pages with associated queries and user behavior data input (block 302), web pages with the most frequent clicks for the same query are searched for and extracted to create a feature matrix for query-based collaborative filtering (block 304). This query-based feature matrix, for example, and associated confidence scores for web site pairs, can be created in the same manner discussed with respect to FIG. 1 and FIG. 2. Similarly, web pages which have the most frequent co-clicks by users are searched for and extracted to create a feature matrix for user-based collaborative filtering (block 306). Again, this user-behavior based feature matrix, and associated confidence scores for website pairs, can also be created in the same manner discussed with respect to FIG. 1 and FIG. 2. As shown in block 308, a combined collaborative filter is created by combining the feature matrix of the query-based collaborative filter and the user-behavior based collaborative filter. This combined feature matrix can also be weighted, for example, by manually selecting weights for each filter. In one embodiment, the confidence scores of the pairs of web sites obtained from the query-based collaborative filtering and the confidence scores of the pairs of web sites obtained from the user-behavior based collaborative filtering are combined to create this combined collaborative filter. The higher the combined confidence score is, the more similar a web page pair is. The combined collaborative filter is then used to recommend one or more web pages related to another web page to a user, as shown in block 310, as discussed above with respect to FIG. 1.

1.4 Mathematical Computations for One Exemplary Embodiment of the Related Links Recommendation Technique.

The exemplary architecture and exemplary processes having been provided, the following paragraphs provide mathematical computations for one exemplary embodiment of the related links recommendation technique. In particular, the following discussion and exemplary computations refer back to the exemplary architecture previously discussed with respect to FIG. 1.

As discussed above, the related links recommendation technique can apply up to three different collaborative filter procedures using a combination of user behavior data, website content and query log data, to create three different collaborative filter models, e.g., a query click model, a user click model and a content click model, that can be combined in pairs or in total in order to recommend websites to one or more users based on the website a user is currently viewing or that has been returned in response to a search query. Exemplary procedures and mathematical details for creating these models are discussed in the paragraphs below.

For the purpose of the following description, Let A be a website ID, Q be a Query (e.g., normalized query text), x be frequency, S be a browser session ID, t be the click time and C is a confidence value.

1.4.1 Query Click Model

As discussed above, with respect to FIG. 1, the related links recommendation technique creates a query click model (block 106 of FIG. 1) by applying a collaborative filtering procedure based on query search clicks (e.g., the user input device selections made on search results returned in response to a search query). The query Q is recognized as a feature of website A. In one embodiment of the technique, the input to the collaborative filtering procedure based on query search clicks is a set of website-query <A,Q> pairs and the output is a set of website-website pairs with a confidence score C, <$A_i$, $A_j$, $C_{i,j}$>. Referring back to FIG. 1, one exemplary collaborative filtering procedure based on query search clicks that creates a query click model (e.g., blocks 104, 106 of FIG. 1) is as follows:

1. Merge the same <A,Q> pairs (e.g., pairs where a given website is clicked for the same query) and count the occurrence of these pairs to build an index of <A,Q, x> pairs (FIG. 1, block 112).
2. Remove noise records. Here a parameter $x_n$ is defined as the frequency lower bound, that is, if $x<x_n$, then the technique will take the pair and associated frequency <A,Q, x> as a noise record and remove this record from further calculation. In one embodiment, $x_n$ was taken as 2. Once the noise records are removed, each website is represented as feature vector A=<{$Q_1$, $x_1$}, {$Q_2$, $x_2$}, {$Q_n$, $x_n$}, . . . >. (e.g., FIG. 1, block 114)
3. Optionally, in one embodiment of the technique, minhash functions are computed to create new features if desired, as will be described in greater detail below. Minhash is a conventional approximate algorithm which is designed to handle large scale data. Using conventional minhash computations, two Minhash algorithm parameters are: H as number of hash functions in each group, G as number of groups. The min-wise hash functions are calculated to select new features called a signature for each website. Each website is represented as new feature vector A=<{$Q'_1$, $x_1$}, {$Q'_2$, $x_2$}, {$Q'_n$, $x_n$}, . . . >. In one working embodiment H was 2 and G was 200.
4. Once the feature vectors are obtained, calculate the similarity between each website pair according to its feature vector (e.g, in one embodiment using a cosine similarity). In one embodiment of the technique, the similarity between website i and website j is defined as $$Similarity_{i,j} = \frac{|A_i * A_j|}{\sqrt{|A_i|}\sqrt{|A_j|}}$$

5. For each website keep only the qualified website pairs. Qualified website pairs are those that have sufficient similarity, for example, based on a prescribed threshold. For example, for qualified pairs two parameters are defined: k means that only the top k results are left with a threshold score 6. In one embodiment of the technique k is 10 and the threshold score, 6, is 0.5.
6. Normalize the similarity value to confidence value. The normalized confidence value is defined as $$C_i = \frac{Similarity_i}{\sum_{n=1}^{k} Similarity_n}.$$

The output then is a set of website pairs and associated confidence values that reflect similarity.

In one embodiment of the technique, since a website suggestion by a query click model may cause a cross language problem (e.g. an English website may suggest Chinese websites), grouping websites by language may be necessary. In this case, the above discussed collaborative filtering procedures can be applied to different language groups separately and the result can then be combined.

1.4.2 Minhash Procedure

As discussed above, a minhash procedure, in one embodiment, can be used to create a signature and new features for each website. The basic idea of the minhash procedure employed in one embodiment of the technique, is to hash features (here, feature means query) of each website for a given number of iterations to build a website and signature matrix. First, features of each website are randomly permutated and the feature in the first position of the row is selected as the hash value. By further combining these hash values into signatures by simple conjunction (e.g, such as if the hash values are A, B, C, the signature is ABC), the websites that share the same signatures are identified as being be similar. In this way, after permutation and selection, similar websites will contain similar signatures, and grouping the hash values into signatures will reduce conflicts. For example, for one hash function, the hash values of different websites sometimes are the same. By defining more hash functions and grouping the hash values, the confliction probability of having the same hash values for different websites is reduced.

1.4.3 User Click Model

As previously discussed with respect to FIG. 1, one embodiment of the related links recommendation technique creates a user click model (blocks 116, 118 of FIG. 1) by applying a collaborative filtering procedure based on user behavior data 120 such as user clicks including both browsing and search clicks. A user session S is recognized as the feature of website A. The process of generating the user click model is very similar to how the query click model is calculated.

The input consists of a set of website-session <A,S> pairs. Whether time t is considered depends on how long the session is. The output of the procedure is a set of website-website pairs and a confidence value, <$A_i$, $A_j$, $C_{i,j}$>. The procedure operates as follows:

1. Extract all <A,S> pairs to create a user click index (FIG. 1, block 122). Use the user click index 122 to represent each website as feature vector A=<{$S_1$, $S_2$, $S_n$}, . . . > (FIG. 1, block 114).
2. Count how many same sessions appeared between each website pair according to its feature vector.
3. For each website keep only the qualified website pairs. For qualified pairs the technique defines two parameters: k means that only the top k results are left with a threshold score δ. In one working embodiment, k is 10 and δ is 10.

4. Normalize the similarity value to Confidence value as:

$$C_i = \frac{\text{Similarity}_i}{\sum_{n=1}^{k} \text{Similarity}_n}$$

1.4.4 Content Click Model

As previously discussed with respect to FIG. 1, one embodiment of content-based recommendation technique creates a content model (blocks 116, 118 of FIG. 1) by applying a collaborative filtering procedure based on websites' content. A term T is recognized as the feature of website A.

The input consists of a set of website-term <A, T> pairs. The output of the procedure is a set of website-website pairs and a confidence value $<A_i, A_j, C_{i,j}>$. The procedure operates as follows:

1. Extract all <A, T> pairs to create a content index (FIG. 1, block 123). Use the content index to represent each website as feature vector $A=<\{T_1, T_2, T_n\}, \ldots>$. (FIG. 1, block).
2. Calculate a cosine similarity between each website pair according to its feature vector.
3. For each website keep only the qualified website pairs. For qualified pairs the technique defines two parameters: k means that only the top k results are left with a threshold score δ. In one working embodiment, k is 10 and δ is 0.6.
4. Normalize the similarity value to Confidence value as:

$$C_i = \frac{\text{Similarity}_i}{\sum_{n=1}^{k} \text{Similarity}_n}$$

1.4.5 Combine Results to Create a Combined Collaborative Filter.

The results of the query-based collaborative filter, user-behavior-based collaborative filter and the content-based collaborative filter, or a subset thereof, are combined to create the combined collaborative filter. To do this the combined collaborative filter merges the output of the query click model, content click model and the user click model and the associated confidence scores. The final confidence score can be defined by $C_{ij}=C_{i,j,q}+C_{i,j,Con}+C_{i,j}$ if all three models are used.

2.0 The Computing Environment

The related links recommendation technique is designed to operate in a computing environment. The following description is intended to provide a brief, general description of a suitable computing environment in which the related links recommendation technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 4:
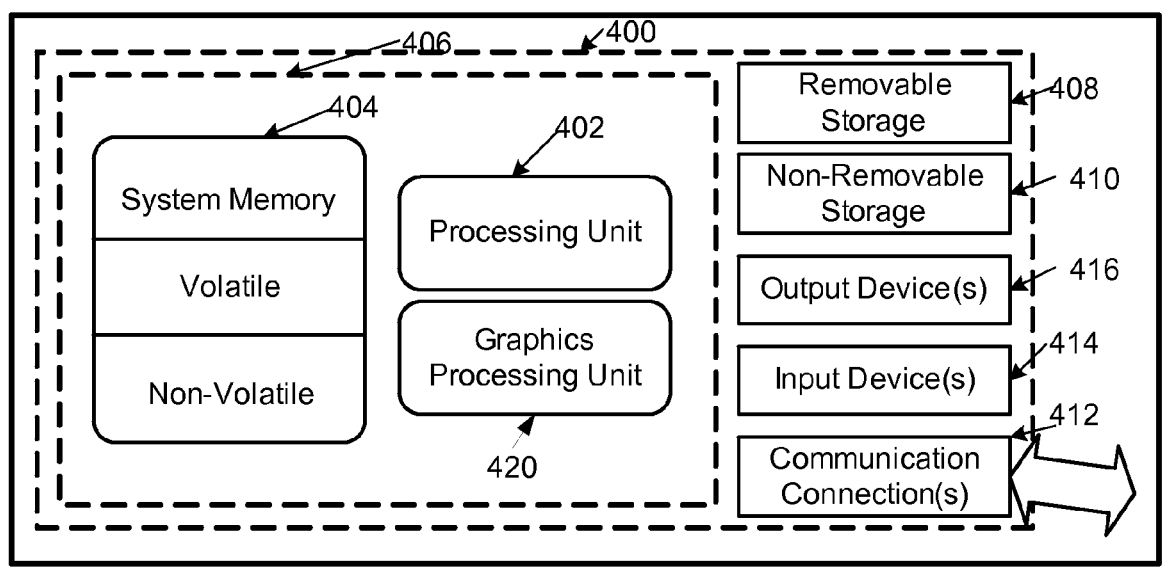
FIG. 4 is a schematic of an exemplary computing device which can be used to practice the related links recommendation technique.

FIG. 4 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 4, an exemplary system for implementing the related links recommendation technique includes a computing device, such as computing device 400. In its most basic configuration, computing device 400 typically includes at least one processing unit 402 and memory 404. Depending on the exact configuration and type of computing device, memory 404 may be volatile (such as RAM), non-volatile (such as ROM, flash memory, etc.) or some combination of the two. This most basic configuration is illustrated in FIG. 4 by dashed line 406. Additionally, device 400 may also have additional features/functionality. For example, device 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cwebsitetes, magnetic tape, magnetic disk storage or other magnetic storage devices, or any other medium which can be used to store the desired information and which can accessed by device 400. Any such computer storage media may be part of device 400.

Device 400 also can contain communications connection(s) 412 that allow the device to communicate with other devices and networks. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 400 may have various input device(s) 414 such as a display, keyboard, mouse, pen, camera, touch input device, and so on. Output device(s) 416 devices such as a display, speakers, a printer, and so on may also be included. All of these devices are well known in the art and need not be discussed at length here.

The related links recommendation technique may be described in the general context of computer-executable instructions, such as program modules, being executed by a computing device. Generally, program modules include routines, programs, objects, components, data structures, and so on, that perform particular tasks or implement particular abstract data types. The related links recommendation technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for recommending web pages to a user based on query data and user behavior data, comprising:
   using a computing device for:
      inputting query log data and user click data;
      computing a query-based collaborative filter based on the query data, comprising pairs of compared websites and a confidence value, wherein the confidence value is obtained by determining a similarity value for each pair of websites that was clicked by a user for a same query and normalizing the similarity value;
      computing a user-based collaborative filter based on the user behavior data, comprising pairs of compared websites with the most frequent number of co-clicks by users and a confidence score for each pair, wherein the confidence value is obtained by determining a similarity value of each pair of websites that were co-clicked by users during searching and browsing during the same user sessions and normalizing the similarity value;
      combining the query-based collaborative filter and user-based collaborative filter to create a combined collaborative filter, that computes the similarity between pairs of websites, for recommending web pages related to a given web page returned in response to a search query.

2. The computer-implemented process of claim 1, further comprising using the combined collaborative filter to recommend to a user one or more web pages related to a given web page.

3. The computer-implemented process of claim 1, wherein computing the query-based collaborative filter further comprises:
   identifying websites in the query log which have the most frequent co-clicks for each query;
   creating a query index of the identified websites that have the most frequent co-clicks for each query;
   creating a query feature matrix comprising the query that lead to a given website and the number of times the website was clicked;
   comparing pairs of websites for each query in the query feature matrix to assess similarity between the websites clicked for a given query and assigning each pair of the compared websites a confidence value based on the similarity between them;
   creating a collaborative query filter comprising the pairs of compared websites and the confidence value based on their similarity.

4. The computer-implemented process of claim 3, wherein a cosine similarity function is used to determine similarity between pairs of websites.

5. The computer-implemented process of claim 4 further comprising removing noise from the query feature matrix by deleting websites that do not have a sufficient number of user clicks for a given query prior to determining similarity.

6. The computer-implemented process of claim 3 further comprising computing features of the query feature matrix by employing a min-hash function.

7. The computer-implemented process of claim 1, wherein computing the user-based collaborative filter further comprises:
   creating a user-based index comprising websites which have the most frequent co-clicks by users based on the user click data; and
   creating a user-based feature matrix comprising pairs of websites with the most frequent number of co-clicks by users;
   computing a similarity between the pairs of websites with the most frequent number of co-clicks by users and creating a confidence score based on the similarity; and
   creating the user-based collaborative filter comprising the pairs of websites with the most frequent number of co-clicks by users and the confidence score for each pair.

8. The computer-implemented process of claim 7, wherein a cosine similarity function is used to determine similarity between websites.

9. The computer-implemented process of claim 7, further comprising removing websites pairs that do not have a sufficient number of co-clicks prior to determining similarity.

10. The computer-implemented process of claim 1 wherein the user behavior data further comprises user session data comprising, user ID, queries submitted by each user ID and clicked URLs by user ID over a given time session.

11. The computer-implemented process of claim 1 wherein the query log data further comprises a set of search queries, web pages returned in response to each search query in the set of search queries and a score as to how many times each of the web pages was clicked by a user for each search query.

12. A computer-implemented process for recommending related web pages to users when they are browsing websites, comprising:
   using a computing device for:
      for each of a set of web pages, associated queries and user behavior data, searching for web pages with the most frequent clicks for the same query to create a feature matrix for query-based collaborative filtering comprising pairs of compared websites and a confidence value, wherein the confidence value is obtained by determining a similarity value for each pair of websites that was clicked by a user for a same query and normalizing the similarity value;
      for each of a set of web pages, associated queries and user behavior data, searching for web pages which have the most frequent co-clicks by users to create a feature matrix for user-based collaborative filtering, comprising pairs of compared websites with the most frequent number of co-clicks by users and a confidence score for each pair, wherein the confidence score is obtained by determining a similarity value of each pair of web pages that were co-clicked by users during searching and browsing during the same user sessions and normalizing the similarity value;
      creating a combined feature matrix by combining the feature matrix for query-based collaborative filtering and user-based collaborative filtering by combining the feature matrix for query-based collaborative filtering and the feature matrix of the user-based collaborative filtering and adding the confidence scores of each pair of web pages to create a final confidence score for each pair of web pages; and using the combined feature matrix and the final confidence score that computes the similarity between pairs of websites, to recommend a web page related to another web page.

13. The computer-implemented process of claim 12, wherein creating a feature matrix for query-based collaborative filtering further comprises employing a minhash function to create features for the query-based feature matrix.

14. The computer-implemented process of claim 12, wherein the query-based collaborative filter is based on input query log data, comprising submitted queries, and websites clicked by users for each submitted query.

15. The computer-implemented process of claim 12, wherein the user-based collaborative filter is based on user session data comprising: user ID and websites clicked by user ID over a given time period.

16. A system for recommending one or more related websites to a user based on a website returned in response to a search query or while browsing, comprising:

a general purpose computing device;

a computer program comprising program modules executable by the general purpose computing device, wherein the computing device is directed by the program modules of the computer program to, compute a query-based collaborative filter based on the number of co-clicks on a websites by users for a given query;

compute a user-based collaborative filter based on the number of co-clicks by users on a given website during searching and browsing during the same user sessions;

compute a content-based collaborative filter based on the similarity of content of website pairs;

combine the query-based collaborative filter, user-based collaborative filter and content-based filter to create a combined collaborative filter, that computes the similarity between pairs of websites, for recommending web pages related to a web page returned in response to a search query.

17. The system of claim 16, further comprising computing the query-based collaborative filter, the user-based collaborative filter and the content-based collaborative filter by:

for each of a set of web pages, for a given web page, searching for web pages with the most similar contents to create a feature matrix for the content-based collaborative filter;

for a given web page, searching for the web pages which have the most frequent co-clicks by users during searching and browsing during the same user sessions to create a feature matrix for the user-based collaborative filter;

for a given web page, searching for web pages with the most frequent co-clicks for the same query to create a feature matrix for the query-based collaborative filter.

18. The system of claim 17 further comprising a module for:

computing a first confidence score for the feature matrix for the content-based collaborative filter using similarity scores of each pair of web pages, computing a second a confidence score for the feature matrix for user-based collaborative filter using similarity scores of each pair of web pages; and computing a third confidence score for the feature matrix for the query-based collaborative filter using similarity scores of each pair of web pages.

19. The system of claim 18, further comprising using the first, second and third confidence scores to merge the content-based collaborative filter, user-based collaborative filter, query-based collaborative filter to create a combined filter for use in recommending one or more web pages related to a web page retrieved in response to a search query.

20. The system of claim 18 wherein the content-based collaborative filter, user-based collaborative filter, query-based collaborative filter are weighted when merging to create the combined collaborative filter to created a weighted combined collaborative filter.

* * * * *